United States Patent
Casteel et al.

(10) Patent No.: US 9,104,778 B2
(45) Date of Patent: Aug. 11, 2015

(54) COOKIE DERIVATIVES

(75) Inventors: Glynne Casteel, Westminster, CO (US); Greg Neal, Evergreen, CO (US); Ron Hill, Broomfield, CO (US)

(73) Assignee: TruEffect, Inc., Broomfield, CO (US)

( * ) Notice: Subject to any disclaimer, the term of this patent is extended or adjusted under 35 U.S.C. 154(b) by 141 days.

(21) Appl. No.: 12/629,842

(22) Filed: Dec. 2, 2009

(65) Prior Publication Data

US 2010/0145960 A1 Jun. 10, 2010

Related U.S. Application Data

(60) Provisional application No. 61/119,311, filed on Dec. 2, 2008.

(51) Int. Cl.
*G06F 17/30* (2006.01)
*G06F 21/62* (2013.01)

(52) U.S. Cl.
CPC .... *G06F 17/30902* (2013.01); *G06F 17/30539* (2013.01); *G06F 21/6245* (2013.01)

(58) Field of Classification Search
CPC ............... G06F 17/30539; G06F 21/6245
See application file for complete search history.

(56) References Cited

U.S. PATENT DOCUMENTS

| | | | |
|---|---|---|---|
| 6,345,288 B1 | 2/2002 | Reed et al. | |
| 6,757,710 B2 | 6/2004 | Reed | |
| 2002/0152378 A1* | 10/2002 | Wallace et al. | 713/168 |
| 2004/0015580 A1* | 1/2004 | Lu et al. | 709/224 |
| 2005/0033641 A1 | 2/2005 | Jha et al. | |
| 2005/0044176 A1* | 2/2005 | Sears et al. | 709/217 |
| 2005/0204148 A1* | 9/2005 | Mayo et al. | 713/185 |
| 2005/0257250 A1* | 11/2005 | Mitchell et al. | 726/3 |
| 2006/0156387 A1* | 7/2006 | Eriksen | 726/3 |
| 2006/0168251 A1* | 7/2006 | Buchheit et al. | 709/228 |
| 2006/0218035 A1* | 9/2006 | Park et al. | 705/14 |
| 2006/0248452 A1 | 11/2006 | Lambert et al. | |
| 2006/0287936 A1 | 12/2006 | Jacobson | |
| 2007/0299928 A1* | 12/2007 | Kohli et al. | 709/217 |
| 2008/0195588 A1* | 8/2008 | Kim et al. | 707/3 |
| 2008/0263627 A1* | 10/2008 | Berteau et al. | 726/1 |
| 2009/0063491 A1* | 3/2009 | Barclay et al. | 707/9 |
| 2009/0106349 A1* | 4/2009 | Harris | 709/203 |
| 2009/0199285 A1* | 8/2009 | Agarwal et al. | 726/9 |
| 2010/0024032 A1* | 1/2010 | Britton et al. | 726/22 |
| 2010/0312778 A1* | 12/2010 | Lu et al. | 707/759 |

OTHER PUBLICATIONS

U.S. Appl. No. 11/450,490, Office Action Dec. 14, 2009, 17 pages.
U.S. Appl. No. 11/450,490, Final Office Action Jun. 29, 2009, 15 pages.
U.S. Appl. No. 11/450,490, Office Action dated Jan. 5, 2009, 17 pages.

* cited by examiner

*Primary Examiner* — Mohammad S Rostami
(74) *Attorney, Agent, or Firm* — Dinsmore & Shohl LLP

(57) ABSTRACT

Cookie derivatives and methods for generating cookie derivatives are provided. A cookie derivative comprises a transformation of at least one portion of data associated with a cookie (e.g., a name and/or data value). The cookie derivative may comprise a persistent or non-persistent cookie derivative that may be stored on a user's computing device (e.g., within a browser). The cookie derivative may alternatively comprise a virtual cookie derivative that is stored on a server (e.g., in a log file, a cache, or other data storage of the server).

28 Claims, 6 Drawing Sheets

| Site | Cookie Name |
|---|---|
| Publisher.com | publisher_cookie |
| Adserver.publisher.com | adserver_cookie |
| Search.publisher.com | search_cookie |
| analytics.com | analytics_cookie |

400

COOKIE DERIVATIVES

CROSS-REFERENCE TO RELATED APPLICATIONS

This application claims the benefit of U.S. provisional patent application No. 61/119,311 entitled "Apparatus and Methodology for Cookie Derivatives" and filed on Dec. 2, 2008, which is incorporated by reference in its entirety as if fully set forth herein.

This application is also related to U.S. patent application Ser. No. 11/450,490 entitled "First Party Advertisement Serving" and filed on Jun. 9, 2006, which is incorporated by reference in its entirety as if fully set forth herein.

FIELD

The presently disclosed technology relates generally to computer system including software, hardware and/or firmware and methods of controlling computer systems, and more particularly to methods for serving advertising via a network, such as the Internet.

BACKGROUND

Existing "cookie" technology enables accurate measurement of the number of unique web page views and click-throughs. Cookies are small text files created and subsequently read by Internet browsers, such as Internet Explorer, Netscape Navigator, Mozilla Firefox, Safari and Google Chrome. The browser sends an existing cookie (represented as a name/value pair) along with a web page request to a web server. If the cookie does not already exist on the browser, the web server can use a browser's cookie facility to set a cookie and store data therein. A web server might store information related to a user's Internet activities such as, an access date, domain name, customer type, and activity type.

Cookies can be stored on a user's computer and are used by advertisers, publishers and ad servers to enhance the user experience in their respective areas. For example, publishers may use the cookie data to store login and customization information. Advertisers may use the data for personal preferences and site optimization information and ad servers would use the data for geo-location and ad rotation information. Advertisers generally have a cookie methodology based on site management/e-commerce/optimization/customer relationship management (CRM) vendors they use. The cookies are set based on the specifications from those vendors.

SUMMARY

Cookie derivatives and methods for generating cookie derivatives are provided. A cookie derivative comprises a transformation of at least one portion of data associated with a cookie (e.g., a name and/or data value). The cookie derivative may comprise a persistent or non-persistent cookie derivative that may be stored on a user's computing device (e.g., within a browser). The cookie derivative may alternatively comprise a virtual cookie derivative that is stored on a server (e.g., in a log file, a cache, or other data storage of the server).

In one particular implementation, a method for generating a cookie derivative comprises transforming cookie data associated with at least one cookie to generate a cookie derivative. The cookie derivative comprises targeting data derived from the data associated with the at least one cookie.

In another implementation a method for generating a cookie derivative comprises extracting at least one cookie from a content provider domain and transforming data associated with the at least one cookie to generate a cookie derivative, the cookie derivative including targeting data derived from the data associated with the at least one cookie.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

The foregoing and other aspects, features, details, utilities, and advantages of the present invention will be apparent from reading the following description and claims, and from reviewing the accompanying drawings.

DESCRIPTION

Figure 1:
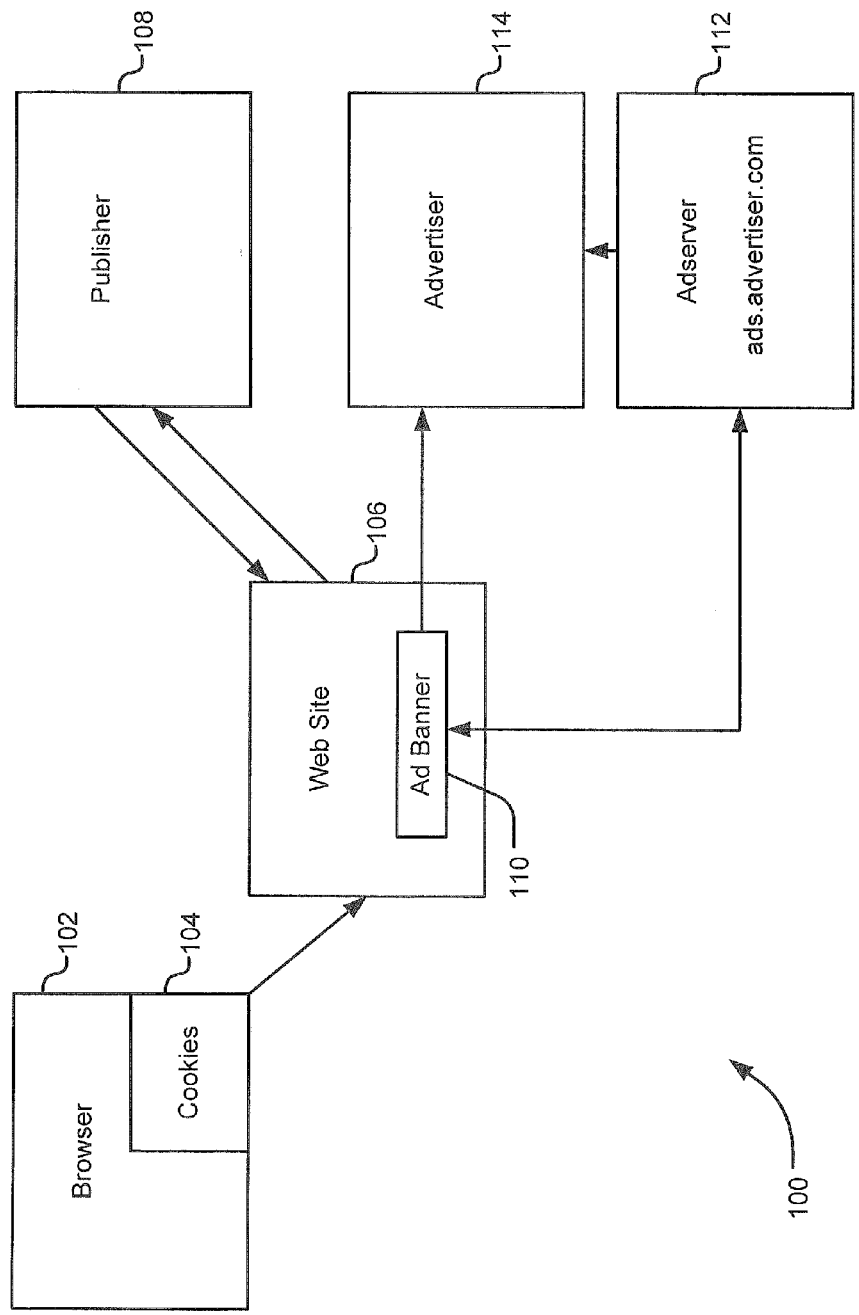
FIG. 1 illustrates an example of an advertisement serving environment.

Cookies, as used herein, comprise browser set cookies, flash cookies, or other data stored and segregated by domain. Analysis of the data associated with these cookies can be aided through creation and analysis of a cookie derivative that is derived from a transformation of one or more cookies. Cookie data comprises a name/value pair that may be transmitted with a web page request from a browser to a web site.

A cookie derivative, as used herein, comprises a transformation of at least one portion of data associated with a cookie (e.g., a name and/or data value). The transformation is not merely concatenating cookie data into a string, such as a search query string, but rather transforms (e.g., truncates, converts, encodes, obfuscates, maps, evaluates, synthesizes, aggregates, discards, performs mathematical or logical operations on, or otherwise transforms data of one or more cookie) the cookie data. Use of a cookie derivative thus enables a party to transform data associated with one or more individual cookies.

Cooke derivatives may also transform data from one or more non-cookie data sources in combination with data associated with one or more cookies. Non-cookie data, for example, may comprise information (e.g., one or more name/value pairs) inserted in a query string by a web page may be used in addition to cookie data to generate the cookie derivative.

Cookie derivatives may also comprise secondary derivatives of data associated with one or more cookies (e.g., a derivative of a cookie derivative). Recursive derivatives, for example, may be used to further transform or refine data derived from one or more cookies.

Cookies are typically set on a user's computer (e.g., in a "cookie jar" or cookie space of a browser) as either a persistent or non-persistent cookie. A persistent cookie, for example, has an expiration date that outlasts a session on the browser. Thus, the cookie will remain in the cookie space of the browser after the browser session is closed and a new session is originated. A non-persistent cookie, however, is stored on a browser but expires with a browser session. Thus, the cookie will be deleted when a browser session is closed and will not be available later.

A virtual cookie or virtual cookie derivative as used herein, however, resides on a server (e.g., in cache memory of a server hosting a web page). The virtual cookie or cookie derivative, for example, can be stored in a log file, cache, or other data storage of the server. The virtual cookie or cookie derivative may be a temporary cookie that resides on the server for a limited period of time, typically for a single transaction or a limited number of transactions. The use of a temporary virtual cookie or virtual cookie derivative can be used to limit privacy concerns since it is discarded or written over after a limited number of transactions. The temporary virtual cookie or cookie derivative may also provide more up to date information where the data associated with it is recalculated for each transaction (or for a limited number of transactions).

A cookie derivative may provide the ability to evaluate expressions based on an existing cookie inventory and save a value to a cookie-like name which can be used in pre-targeting and re-targeting. The values can also be saved in a virtual environment and stored in cache only which will eventually be overwritten.

In one particular implementation, a cookie derivative may be used to analyze data set in one or more cookies by one or more other parties within a common domain. This data may be used within a web site served by parties within the common domain. In an advertisement serving implementation, use of a cookie derivative enables a party to read advertiser domain cookies and then use that data outside of the site, for example, wherever an advertiser purchases digital media. The use of cookie derivatives, for example, allows for the cookie data to be transformed (e.g., information evoking privacy concerns can be redacted, obfuscated, encoded or otherwise transformed to reduce the privacy concerns).

In one implementation, a virtual cookie can be redirected (e.g., via a 302 redirect) to a different domain (e.g., a domain of a partner). The virtual cookie, for example, may be embedded into a URL query string to a downstream entity outside of the domain even though a real cookie could not be read by the downstream entity because it is outside of the domain. The transformation of the cookie data may transform any data that would otherwise evoke privacy concerns into benign data that would no longer have the same privacy concerns. Certain cookie data could be obfuscated, encoded or otherwise altered or sensitive information could even be redacted or otherwise stripped out in the cookie derivative to minimize or eliminate privacy concerns. In this manner another party (e.g., the partner) could leverage the original party's targets outside of a cookie domain through the use of the cookie derivative.

A cookie derivative may be generated by "reading" one or more cookies set in a domain (e.g., an advertiser domain) and producing values based on those cookies. With a cookie derivative, it may be possible to extract data sets in multiple cookies created for different purposes (e.g., site management, ecommerce, optimization, customer relationship management (CRM)) and aggregate those data sets into a single cookie derivative with multiple disparate values. The cookie derivative could be written into existing or new cookies (i.e., persistent) and/or stored in cache and never captured (i.e., non-persistent). A non-persistent cookie that may be discarded shortly after it is used for analyzing data for a transition may enhance privacy for users in that the data is generated and used in one or more individual transactions, such as serving an advertisement, but not kept or used to further track information related to a user that the user might find objectionable.

A cookie derivative may provide functionalities not available through current cookies. For example, use of a cookie derivative may provide time savings by not having to rewrite over other vendor's cookies to produce targetable cookie values, enhancements in privacy by pulling only the data that is needed for targeting from cookies that may have additional unneeded private information, use of additional targeting data from aggregation of multiple cookies, and additional enhancements in privacy when a cookie derivative is only stored in cache so that data included in the cookie derivative is neither permanently stored nor saved.

In one implementation, a cookie derivative is created by extracting data from a single cookie to reformat data that is currently unusable by a targeting engine (e.g., date or other data formats). In another implementation, the cookie derivative is created by extracting data from multiple cookies to form a single target from multiple data points (e.g., a single virtual cookie derivative). The extracted data may be written to an existing cookie, written to a new cookie, stored on a server (e.g., in a log file, cache, or other data storage), forwarded to subsequent targeting engines for use in different media types or different devices, etc.

In one implementation, a browser may contact a server to retrieve the server cookie data. The server cookie data is then refined and concatenated and relevant data is extracted to generate a cookie derivative. Once a cookie derivative is evaluated, it's available for use within SQL targets just like a regular cookie. The cookie derivative may be evaluated against SQL targeting data and subsequently returned to the browser with information for a specific targeted ad. In another implementation, the cookie derivative may be passed on to a secondary ad server or device to deliver a targeted ad.

A cookie derivative enables data extraction from cookies set within an advertiser domain. These cookies can be set for multiple purposes including site management, ecommerce, optimization, CRM, and the like. The cookie derivative allows the creating party to leverage advertisers, or publishers existing cookies to pull data from a single or multiple cookies to create new cookies or virtual cookies for targeting.

Additionally, cookie derivatives may be used to pass on the derived info to a third-party for targeting or creative construction in a dynamic creative environment or for targeting on a different type of device (e.g., a mobile device, a set top box, an ATM, or the like).

FIG. 1 illustrates a block diagram of an example system 100 showing advertisement serving. In this implementation, a user operates a web browser 102 that includes one or more cookies 104. The web browser 102 may be resident on any digital media addressable device, such as but not limited to a personal computer, a laptop computer, a handheld device (e.g., a cell phone, an MP3 player, a blackberry, a personal data assistant), or the like. The user directs the browser 102 to a web site 106, such as "www.website.com," via the browser 102. The web site 106 is served by a publisher 108, which is responsible for the overall content of the web site 106. The browser 102 sends a request to the publisher 108 for content of the web site 106 served by that publisher 108. The publisher 108 serves the web site 106 by providing content for at least a portion of the site. If one or more of the cookies 104 had previously been set by the publisher 108, the one or more of the cookies 104 set by the publisher 108 is forwarded to the publisher 108 along with the request.

In the implementation shown in FIG. 1, the web site 106 also includes a banner advertisement 110 served by an adserver 112. The adserver 112 is associated with at least one advertiser 114 and provides advertisements in the banner 110 on behalf of the at least one advertiser 114. One or more other components of the web site may be served by a content provider other than the publisher 108, such as another advertiser, other content provider, an analytics vendor, a search vendor, or the like. These other content providers, for example, may set cookies 104 on the browser 102 and/or receive cookies 104 from the browser.

The adserver 112 receives the request to serve the advertiser banner 110 and determines an advertisement for displaying in the banner 110. The adserver 112, for example, may determine an appropriate content for the advertising banner 110 depending upon at least one value of one or more cookies received from the browser 102. When the adserver 112 receives and reads a cookie 104 accompanying a browser request, for example, the adserver 112 may recognize one or more cookie values identified for advertisement selection.

If the user clicks on or otherwise selects the advertisement in the banner 110, the user's browser is directed to a web site of the advertiser 114.

Cookie derivatives may be generated and used within the system illustrated in FIG. 1. In one example, a "velocity" cookie derivative may be generated based on cookie data associated with at least one cookie. In this implementation, a time period, Δt, may be calculated from a first seen value and a last seen value from one or more cookies. Similarly, a number of visits, Δvisits, within that time period may also be calculated from a first count and a last count of user visits from one or more visits. The velocity cookie derivative value, for example, may be obtained by dividing the number of visits by the time period (e.g., Δvisits/Δt) to obtain a number of visits per time period (e.g., number of visits per day). As described above, this example of a velocity calculation may be performed as a recursive calculation in which a first cookie derivative is generated to determine the time period, a second cookie derivative is generated to determine the number of visits, and a third cookie derivative is generated to determine the velocity, or number of visits per time period.

Such cookie derivative values may be calculated "live" as a virtual cookie on a server and used immediately within the server for targeting. This allows for more up to date and accurate targeting information than would otherwise be available from a database that is updated on a delayed basis. Again, the cookie derivative values may be stored as a persistent or non-persistent cookie derivative (e.g., written into a new or existing cookie) or may be used as a virtual cookie derivative on the server (e.g., stored in a log file, cache, or other data storage). In addition, a cookie derivative may be transformed so that it may be passed out of a domain in which the cookie data would otherwise be segregated. Transformation of the data within the cookie derivative may allow for the cookie data to be useful (e.g., recognized) outside of the domain and/or to redact, obfuscate, encode or otherwise transformed to reduce privacy concerns with forwarding such data outside of the initial domain.

Figure 2:
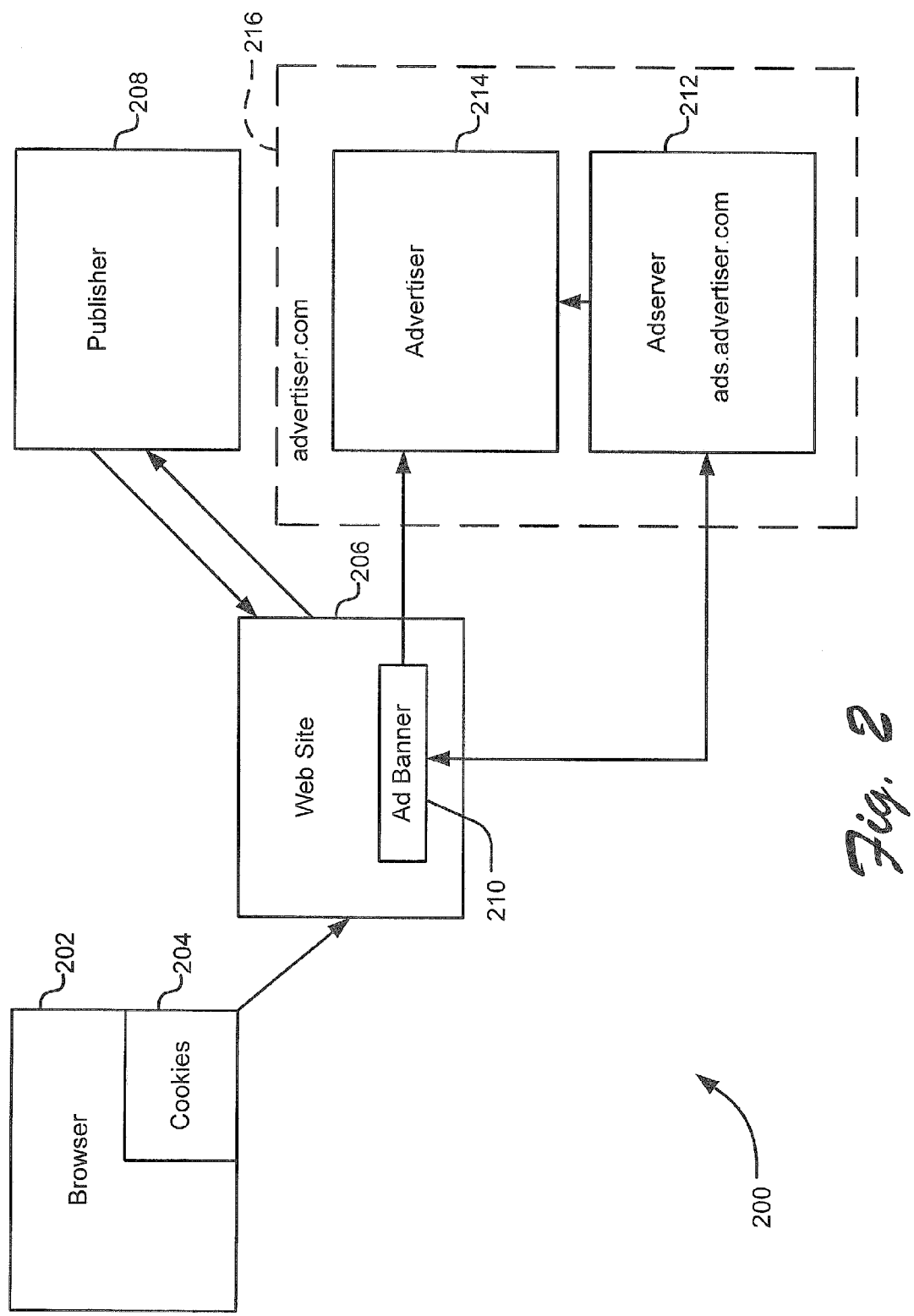
FIG. 2 illustrates an example of a first party advertisement serving environment.

FIG. 2 illustrates a block diagram of an example system 200 showing first party advertisement serving. In this implementation, a user operates a web browser 202 that includes one or more cookies 204. The web browser 202 may be resident on any digital media addressable device, such as but not limited to a personal computer, a laptop computer, a handheld device (e.g., a cell phone, an MP3 player, a blackberry, a personal data assistant), or the like. The user directs the browser 202 to a web site 206, such as "www.website.com," via the browser 202. The web site 206 is served by a publisher 208, which is responsible for the overall content of the web site 206. The browser 202 sends a request to the publisher 208 for content of the web site 206 served by that publisher 208. The publisher 208 serves the web site 206 by providing content for at least a portion of the site. As described above, if one or more of the cookies 204 had previously been set by the publisher 208, the one or more of the cookies 204 set by the publisher 208 is forwarded to the publisher 208 along with the request.

In the implementation shown in FIG. 2, the web site 206 also includes a banner advertisement 210 served by an adserver 212. The adserver 212 is associated with at least one advertiser 214 and provides advertisements in the banner 210 on behalf of the at least one advertiser 214. One or more other components of the web site may be served by a content provider other than the publisher 208, such as another advertiser, other content provider, an analytics vendor, a search vendor, or the like.

The adserver 212 shares a domain 216 with the advertiser 214. In this implementation, the advertiser has a domain 216 of "advertiser.com," and the adserver 212 is assigned a sub-domain of the advertiser's domain, i.e., "ads.advertiser.com." Since the adserver 212 shares the domain of the advertiser 214, the adserver 212 has first party access to a cookie that has been previously been set by the advertiser 214. Thus, if the user has previously made a purchase on a web site published by the advertiser 214, the advertiser site may have set a cookie on the user's browser 202 identifying the user as a customer. The browser 202 then sends a copy of the cookie set by the advertiser 214 to the adserver 212 along with a request for content for the banner advertisement 210.

There are various methods by which an advertiser 214 can provide sub-domain access to an adserver 212. In one implementation, for example, the advertiser 214 uses its domain name service (DNS) servers to delegate or redirect sub-domain DNS requests to adserver DNS servers. This process is called DNS delegation. This can be accomplished by creating Name Server (NS) records in the advertiser DNS servers that point to the adserver DNS server. Further explanation of this process can be found in RFC1591. In another implementation, the advertiser 214 can point their host name to the adserver's Internet Protocol (IP) address by means of an Address Record (or "A Record") in the advertiser DNS servers. In yet another implementation, the adserver's hardware and software are co-located within the advertiser's infrastructure or co-located on the same network as the advertiser's infrastructure.

When an adserver DNS server receives a redirect, it takes the logical name of a sub-domain sent from the advertiser DNS server (e.g., "ads.companyname.com") and resolves it into an adserver IP address. For example, "ads.companyname.com" would be resolved into an IP address, such as "216.150.209.230." A browser request for the web site "ads.companyname.com" travels to the advertiser DNS server and then to the adserver DNS server. The adserver DNS server would return the IP address "216.150.209.230" to the browser. After receiving the associated IP address, the browser sends any cookies associated with the domain ".advertiser.com" along with the web page request to the associated IP address. On advantage of DNS delegation, for example, is that it can seamlessly integrate with an adserver's existing proprietary solutions for load-balancing and failover of advertisement serving.

The adserver 212 receives the request to serve the advertiser banner 210 and determines an advertisement for displaying in the banner 210. The adserver 212, for example, may determine an appropriate content for the advertising banner 210 depending upon at least one value of a cookie received from the browser 202. When the adserver 212 receives and reads a cookie 204 accompanying a browser request, for example, the adserver 212 may recognize cookie values identified for advertisement selection that the advertiser's web server originally placed in the cookie. For example, if an advertiser's web server recognizes that a particular customer who is visiting the advertiser's web site is a high value customer. The web server then sets a cookie 204 to the customer's browser 202 containing the domain ".advertiser.com" and the data "Target=high_value." The advertiser 214 previously communicated with an adserver 212 to convey the rule that whenever the adserver 212 encounters cookie data with "Target=high_value," the adserver 212 should recognize that it is dealing with a high value customer of the advertiser 214 and should serve advertising appropriate to such a customer. Each time the customer visits the "www.advertiser.com" web site, the "Target" cookie value can be reset by the advertiser's web server to reflect the customer's current value status. For instance, the customer may be a "medium_value" customer when he first accesses the advertiser's web site, but then makes a large purchase. The advertiser's web server can update the customer's status to "high_value" and then reset the cookie information accordingly. If the customer's browser 202 subsequently interacts with the adserver's web server, the updated cookie value will instantaneously cause a "high_value" advertisement to be returned from the adserver's web server to the customer's browser 202.

While the adserver 212 is serving web advertising from within the domain 216 of the advertiser 214, the adserver 112 may not be not limited to serving advertisements on behalf of the primary advertiser 214. Instead, the adserver 212 can serve advertisements from one or more other companies (or fourth parties). If the fourth parties have pre-existing relationships with the advertiser 214 (e.g., marketing partnerships, cross-selling agreements, joint ventures, etc.) both the advertiser 214 and fourth parties can reap the extra benefits of having the fourth party advertisements be served from within a sub-domain of the advertiser 214.

If the user clicks on or otherwise selects the advertisement in the banner 210, the user's browser is directed to a web site of the advertiser 214, which is located within the advertiser's domain "advertiser.com."

Examples of first party advertisement serving, which may be used in combination with cookie derivatives are further described in U.S. patent application Ser. No. 11/450,490 entitled "First Party Advertisement Serving" and filed on Jun. 9, 2006, which is incorporated by reference in its entirety as if fully set forth herein.

Cookie derivatives may be generated and used within a first party cookie system, such as the system 200 shown in FIG. 2. By sharing a domain among a plurality of parties, the cookie data for each of those parties is available to each of the other parties sharing that domain. Thus, a cookie derivative may be generated that includes cookie data from multiple different parties that would not otherwise be accessible to the other parties for targeting or other applications. These cookie derivatives may be particularly advantageous to be used live in a virtual space on a server compared to analytics databases that are updated on a much less frequent time basis.

Figure 3:
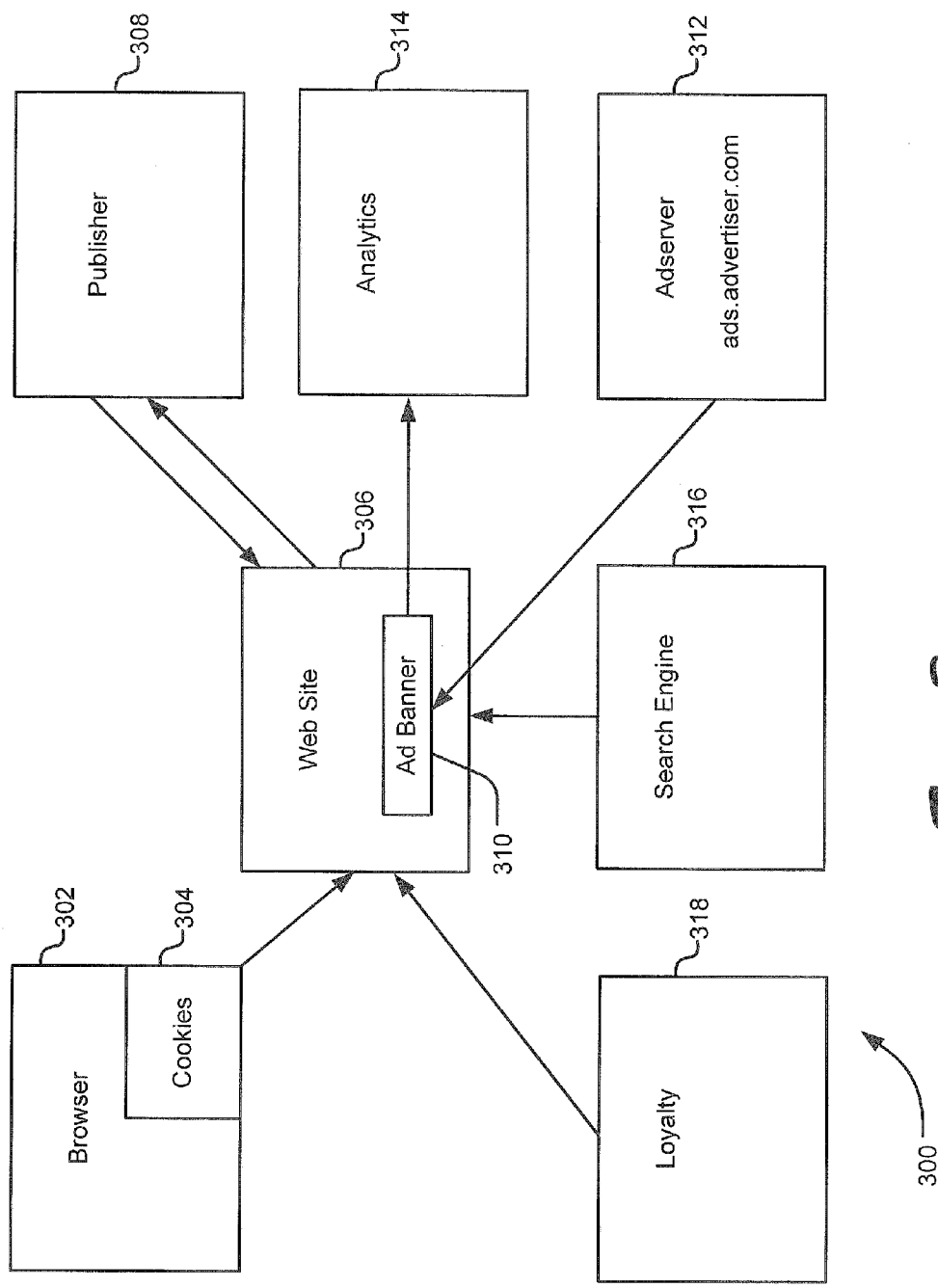
FIG. 3 illustrates an exemplary system in which derivative cookies are created and/or managed.

FIG. 3 illustrates an exemplary system 300 in which derivative cookies are created and/or managed. The system 300 includes a web site 302 accessible over a network, such as the Internet. A user may access the web site 302 by navigating to the site via a browser 304 that includes one or more cookies 306. The web site 302, for example, may be hosted on a server of a publisher 308.

Aspects of the web site may be served by a third party content provider, such as an advertiser 312, another content provider, an analytics vendor 314, a search vendor 316, and/or the like. In the example illustrated in FIG. 3, for example, various aspects of the web site 302 are served by an adserver 312, an analytics vendor 314 (e.g., Omniture, Google Analytics, Coremetrics, Web Trends, or the like), a search engine vendor 316 (e.g., Google, Yahoo, or the like), a customer relationship manager 318, or other third parties. Similar to the publisher 308, the third party content providers, if any, can set one or more cookies on the browser 304 and/or receive one or more cookies from the browser 304.

Cookie derivatives may also be created from one or more cookies set on and/or received from the browser 304. Non-cookie data may be used in addition to cookie data in order to generate a cookie derivative. Non-cookie data, for example, may comprise information (e.g., one or more name/value pairs) inserted in a query string by a web page may be used in addition to cookie data to generate the cookie derivative.

Again, the cookie derivative values may be stored as a persistent or non-persistent cookie derivative (e.g., written into a new or existing cookie) or may be used as a virtual cookie derivative on the server (e.g., stored in a log file, cache, or other data storage). In addition, a cookie derivative may be transformed so that it may be passed out of a domain in which the cookie data would otherwise be segregated. Transformation of the data within the cookie derivative may allow for the cookie data to be useful (e.g., recognized) outside of the domain and/or to redact, obfuscate, encode or otherwise transformed to reduce privacy concerns with forwarding such data outside of the initial domain.

In the example illustrated in FIG. 3, for example, the publisher 308 and other content providers serving content on the web site 302 can each set one or more cookies 306 on the browser 304 and/or access one or more cookies 306 received from the browser 304. As described above, cookie derivatives derived from these cookies may be used within a typical advertisement serving environment or within a first party advertisement serving environment. In a typical environment, each content provider may access their own cookies to generate one or more cookie derivatives for use in a transaction, such as authorizing access to the web site, serving advertisements on the web site 302, or the like.

Similarly, in a first party system, two or more of the content providers (e.g., the publisher 308, and advertisement server, an analytics vendor, a search engine vendor, and the like) may share a domain in which the two or more content providers may each access one or more cookies or cookie derivatives generated by the other associated content providers sharing the same domain. In this particular implementation, a content provider, such as the publisher 308, may delegate one or more sub-domains to other content providers such that each of the content providers operate within a single domain so that each of the content providers within that domain can access cookies set by other content providers sharing that domain. Thus, cookie derivatives of one or more cookies set by another content provider within the same domain may be generated for analysis. In this implementation, the publisher 308 may own all the cookie information generated by the various content providers and leverage information from various types of providers in one or more cookie derivatives.

Figure 4:
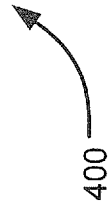
FIG. 4 illustrates an example of a listing of cookies 400 for a web site.

FIG. 4 illustrates an example of a listing of cookies 400 for a web site. As shown in FIG. 4, the publisher serves content for a web site from a domain publisher.com. Various other content providers generate and set cookies on a browser accessing the web site either within the domain publisher.com (e.g., as a sub-domain) or from an independent domain. In the particular example shown in FIG. 4, for example, an advertisement server serves advertisements on the web site (e.g., in a banner) using the sub-domain (adserver.publisher.com), a search engine provides search functions on the web site using the subdomain (search.publisher.com), while an analytics vendor serves content from the web site from its own independent domain analytics.com. In this particular implementation, the publisher, the advertisement server, and the search engine provider can each access cookies set within the domain (publisher.com) and can thus use information set in a cookie by another content provider within that domain. In this manner, a cookie derivative may be generated using content from cookies set by any of the publisher, advertisement server, or search engine provider. Thus, a rich set of information may be available for analysis and to generate the cookie derivative that might not be available except for potentially out-of-date information stored in a cumbersome database.

Figure 5:
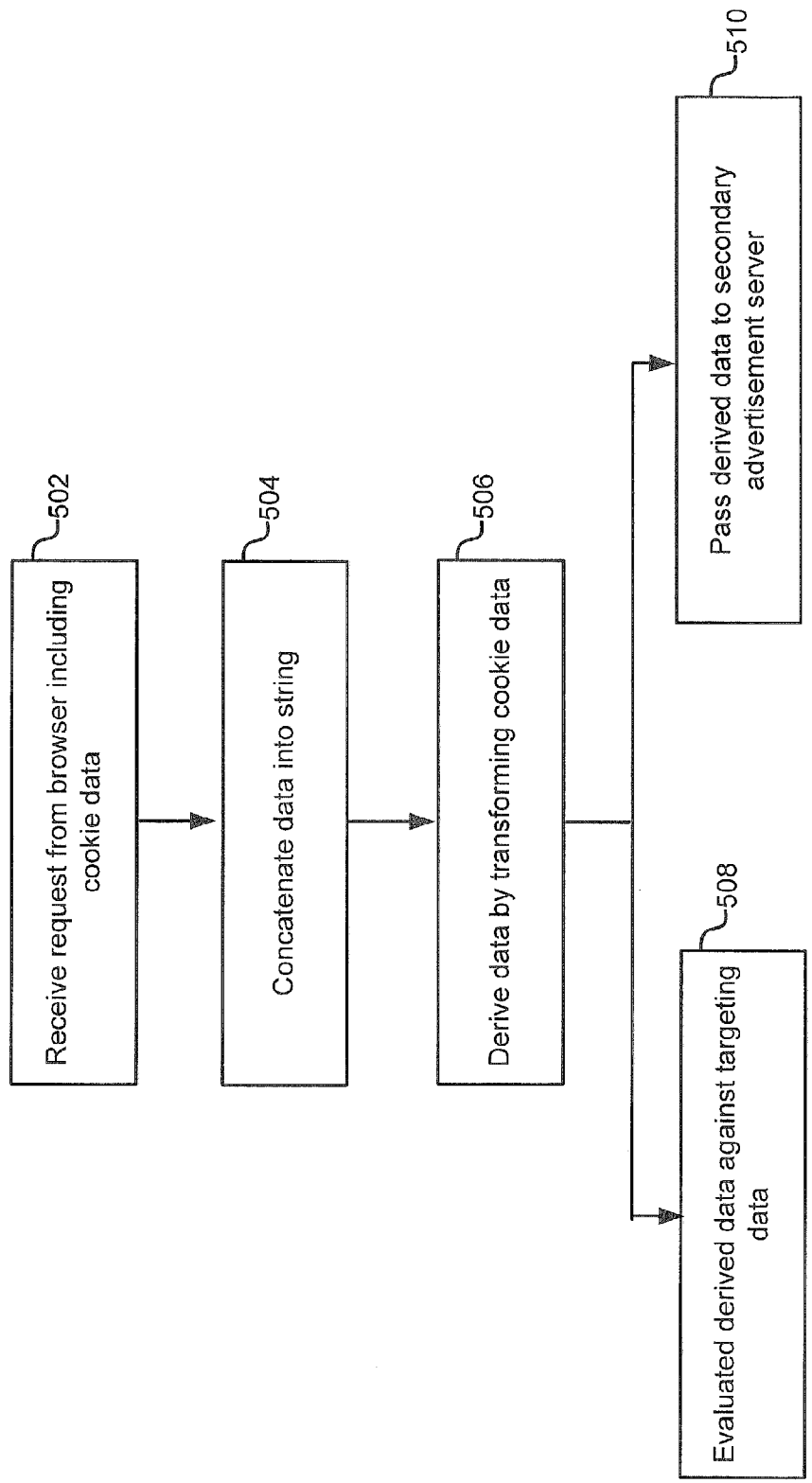
FIG. 5 illustrates an example process 500 in which cookie derivatives are generated and used.

FIG. 5 illustrates an example process 500 in which cookie derivatives are generated and used. In FIG. 5, a server receives a request from a browser in operation 502. The request includes data from at least one cookie. In one example, data from two cookies (e.g., name/value pairs Cookie_A=Red and Cookie_B=Single) are received. Optionally, data from the two cookies is concatenated into a single string in operation 504. In this example, the string may be concatenated as "&Cookie_A=Red&Cookie_B=Single".

Data is then derived by transforming at least one cookie data value (e.g., from the concatenated string or directly from the original name/value pairs received from the browser) in operation 506. The data may be derived, for example, by applying one or more formulas to the concatenated string to create a derived string (e.g., &Cookie_A=R&Cookie_C=1). In this particular example, the value of Cookie_A is transformed from "Red" to "R" and both the name and value of Cookie_B is transformed from "B" to "C" and from "Single" to "1", respectively. The derived data is then either evaluated against targeting data (e.g., SQL targeting data), which may be subsequently returned to the requesting browser (e.g., with a 302 redirect including information for a specific targeted advertisement) in operation 508 or passed on to a secondary advertisement server or device to deliver the targeted advertisement in operation 510. In evaluation operation 508, for example, the following SQL targets may be used:

"Cookie_A="R"->TARGET GROUP 1
"Cookie_C="1"->TARGET GROUP 2.

In this example, if a data value of a cookie derivative matches the condition for Target Group 1, an advertisement associated with that group is eligible to be served. Similarly, if a data value of a cookie derivative matches the condition for Target Group 2, an advertisement associated with that group is eligible to be served. If neither condition is met, a default selection of an advertisement may be served.

The specific transformations discussed with respect to FIG. 5 are merely examples. Further non-limiting examples of transformations that may be used to generate a cookie derivative include the following:

1) Case-conversion (lowercase --> uppercase)
    Cookies:
        Lower = pretty_red_dress
    Derivatives:
        Upper = PRETTY_RED_DRESS 2) Find and Replace Substring (red --> yellow)
    Cookies:
        C = pretty_red_dress
    Derivatives:
        D = pretty_yellow_dress
3) Encode/Obfuscate names (Age --> A)
    Cookies:
        Age = 32
    Derivatives:
        A = 3
4) Map/Encode Values (Blue --> 1, Red --> 2)
    Cookies:
        Car = Red
        Eyes = Blue
    Derivatives:
        Car = 2
        Eyes = 1
5) Evaluate Numeric Expressions
    Cookies:
        First = 2009-11-11
        Last = 2009-11-13
        Visits = 10
    Derivatives:
        Velocity = 5 (Last-First)/Visits
6) Truncation (after 6 chars)
    Cookies:
        OrderStatus = Thank_You_Page
    Derivatives:
        OrderStatus = Thank_
7) Cookie Existence / Discard Value
    Cookies:
        Order = 12838ssk:dq9qwewe9q0:2q399sa0:oost
    Derivatives:
        Order = true Further, non-limiting examples of non-transformational operations that may be performed on cookie data to generate a cookie derivative along with at least one other transformational operations include at least the following:

1) Concatenation of values (use colon delimiters)
    Cookies:
        Color = Red
        Item = Flowers
        Qty = 5
    Derivatives:
        Summary = 5:Red:Flowers
2) Extraction of sub-values (break at colon delimiters)
    Cookies:
        Summary = 5:Red:Flowers
    Derivatives:
        Qty = 5
        Item = Flowers
        Color = Red Non-limiting example of syntaxes, mathematical expressions, and strings are provided as follows. Other syntaxes, expressions, and strings, however, could be derived from the present description.

SYNTAX: the syntax of an example new "Cookie_Derivative_Table" in a hypertree is very close to those of an existing "Cookie_Target_Table":

Cookie_Target_Table|.C.com|firstvisit|
Cookie_Derivative_Table|.V.com|D:sysdate=~%Y%m%d.-%H%M%S;
D:sysdays=~; M:yesterday={sysdays}-1;
S:sval=yesterday & _was_ & {yesterday}|

But rather than a cookie name, the last field in the table is a sequence of semicolon delimited statements. A 'D:' prefix denotes Date expressions, an 'S:' for String expressions, and an 'M:' for Math expressions. Within each expression curly braces represent the name of previously defined cookies or derivatives, e.g. {color}. All whitespace within an expression or cookie is removed prior to evaluation. To preserve whitespace, it can be URL-encoded.

Beyond that, each type of expression has its own set of infix operators.

Dates: Date expressions contain 3 parameters (all of which are optional) delimited by ^ (carats).

The first & last parameters are format strings recognized by strptime( ) and strftime( ), respectively.

The default output format is hours since the epoch, e.g. time(NULL)/86400.

The middle parameter is a date string in the format specified by the 1st parameter.

Here are some examples . . .
D:sysdate=^ ^
D:sysdate=%m/%d/%y%H:%M:%S^08/23/2008 23:59: 58^%Y%m%d.%H%M%S MATHEMATICAL EXPRESSIONS: Mathematical expressions can contain the usual set of infix operators with the usual precedence rules. Example operators are (in order of precedence) {^, %, /, *, −, +}. Note that the first two ops represent exponentiation and modulus. Operator precedence rules can be overridden thru the use of parentheses, e.g. (8.0−3.2)*3. Functions are also provided, including: sin( ) cos( ) abs( ) log( ) exp( ) min( ) max( ) neg( ) pos( ), sqrt( ) ceil( ) floor( ) trunc( ) round( ) etc.

The neg/pos functions make up if there are no unary operations using −/+, e.g. exp(−5.5*7) can be re-written as exp(neg (5.5)*7).

In this example, all expressions are evaluated using double precision floating point arithmetic. Some examples include the following:

$$M{:}\log X = \log(\{X\})$$

$$M{:}abc7 = \{a\}*\{b\}*\max(7,\{c\})$$

Note that any references to non-existent cookies can be replaced with "Not-a-Number" aka "NaN" values. The calculation proceeds, but the result is "NaN". "Inf" in a literal or cookie value can be be represented as infinity. Calculations with infinities can produce finite values, e.g. the following produces a value of 1.2: M:x=1.2+7.7/Inf Coincidentally, assuming the appropriate cookie values are made available, a calculation can be made as follows: a rate of change (i.e., an actual derivative) as:

$$M{:}dx\_dt = (\{x2\} - \{x1\})/(\{t2\} - \{t1\}).$$

STRINGS: Example operators are (in order of precedence) {+, −, /, &, ^, |}. Two utility functions are also provided: len( ), exists( ) This syntax can be explained by translating some common string functions.

```
LeftStr(x, start, length)    --> x + start / length
MidStr(x, start, length)     --> x + start / length
RightStr(x, start, length)   --> x − start / length
strstr(x, substr)            --> x | substr
strcasestr(x, substr)        --> x ^ substr
strcat(x,y)                  --> x & y
truncate(x,length)           --> x / 5
strlen(x)                    --> len(x)
x is not empty|null          --> exists(x)
```

The following are some concrete examples:
"abc &_xyz" produces "abc_xyz"
"abcde^bc" produces "bcde"
"abcde/3" produces "abc"
"abcde+2" produces "cde"
"abcde−2" produces "de"

Cookies and derivatives can also be referenced as follows: "{color}−2" produces the last 2 chars of the color cookie TARGETING WITH DERIVATIVES: Once a derivative is evaluated, it's available for use within SQL targets just like a regular cookie. The following are example cookie derivatives that can be targeted.

D:F=%D%T^{firstvisit}^%s;
D:L=%D%T^{lastvisit}^%s;
D:LastQtr=%D%T^{lastvisit}^%m;
M:LastQtr=({LastQtr}+2)/3;
D:FirstQtr=%D%T^{firstvisit}^%m;
M:FirstQtr=({FirstQtr}+2)/3;
D:Today=^ ^;
M:T_L={Today}−{L};
M:L_F={L}−{F};
S:Control={PrefID}−3;
M:Control=1{Control}%100;
Then, example targets are:

| GROUP | Expression |
|---|---|
| non-CCD target: | lastvisit is null |
| new-to-store: | visitcount<3 and L_F < 5 |
| seasonal: | visitcount<3 and FirstQtr = 4 and LastQtr = 4 |
| occasional: | visitcount<3 and T_L < 5 |
| avid: | visitcount between 3 and 5 |
| die-hard: | visitcount > 5 |
| Control: | control <= 2 |

Figure 6:
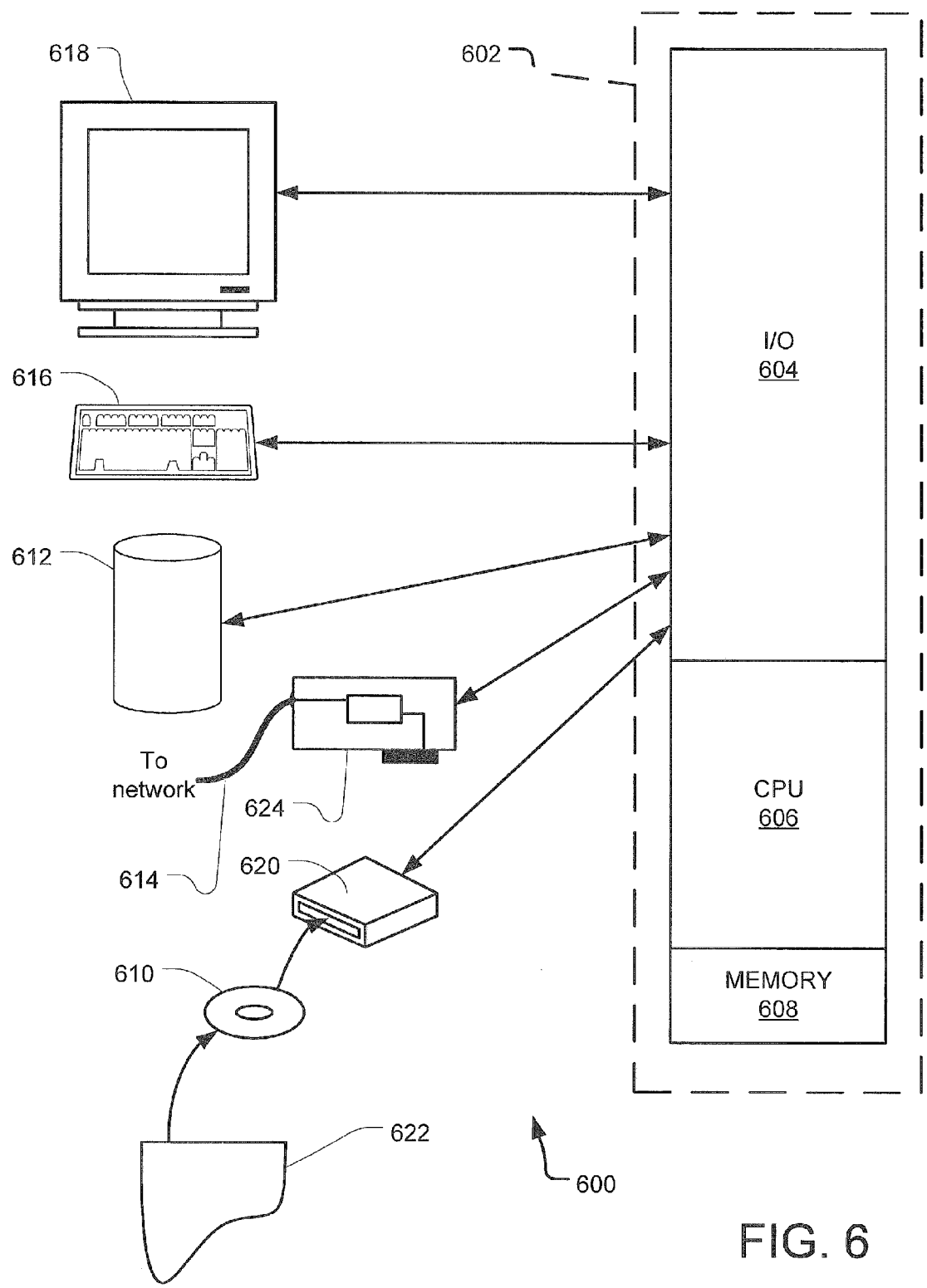
FIG. 6 illustrates an example system useful in implementations of the described technology.

FIG. 6 illustrates an exemplary system useful in implementations of the described technology. A general purpose computer system 600 is capable of executing a computer program product to execute a computer process. Data and program files may be input to the computer system 600, which reads the files and executes the programs therein. Some of the elements of a general purpose computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a distributed computer, or any other type of computer. The described technology is optionally implemented in software devices loaded in memory 608, stored on a configured DVD/CD-ROM 610 or storage unit 612, and/or communicated via a wired or wireless network link 614 on a carrier signal, thereby transforming the computer system 600 in FIG. 6 into a special purpose machine for implementing the described operations.

The I/O section 604 is connected to one or more user-interface devices (e.g., a keyboard 616 and a display unit 618), a disk storage unit 612, and a disk drive unit 620. Generally, in contemporary systems, the disk drive unit 620 is a DVD/CD-ROM drive unit capable of reading the DVD/CD-ROM medium 610, which typically contains programs and data 622. Computer program products containing mechanisms to effectuate the systems and methods in accordance with the described technology may reside in the memory section 608, on a disk storage unit 612, or on the DVD/CD-ROM medium 610 of such a system 600. Alternatively, a disk drive unit 620 may be replaced or supplemented by a floppy drive unit, a tape drive unit, or other storage medium drive unit. The network adapter 624 is capable of connecting the computer system to a network via the network link 614, through which the computer system can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are exemplary and other means of and communications devices for establishing a communications link between the computers may be used.

In accordance with an implementation, software instructions and data directed toward operating the subsystems may reside on the disk storage unit 612, disk drive unit 620 or other storage medium units coupled to the computer system. Said software instructions may also be executed by CPU 606.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Furthermore, certain operations in the methods described above must naturally precede others for the described method to function as described. However, the described methods are not limited to the order of operations described if such order sequence does not alter the functionality of the method. That is, it is recognized that some operations may be performed before or after other operations without departing from the scope and spirit of the claims.

These and other example embodiments are described and shown in the one or more attached Appendices, filed concurrently herewith and incorporated herein by reference for all purposes.

What is claimed is:

1. A method for providing a virtual cookie derivative comprising:
    receiving a request for content at a first party server, the request for content including at least one cookie associated with a first party domain of an advertiser;
    transforming a value component of a name/value pair of cookie data associated with the at least one cookie in response to the request for content to generate a temporary virtual cookie derivative at the first party server, the temporary virtual cookie derivative residing on the first party server for a limited period of time and comprising a derivative data value derived from the data associated with the at least one cookie wherein the operation of transforming cookie data comprises removing privacy related information of the cookie data, wherein the temporary virtual cookie derivative is discarded or written over after a limited number of transactions;
    passing the virtual cookie derivative to a third party ad server outside of the first party domain of the advertiser;
    evaluating, at the third party ad server, the derivative data value of the cookie derivative against targeting data to determine advertisement content to be returned in response to the request for content; and
    returning the determined advertisement content from the third party ad server in response to the request for content,
    wherein the at least one cookie is not modified at a client browser.

2. The method of claim 1 wherein the cookie data is received at the first party server with a browser request.

3. The method of claim 1 wherein non-cookie data is used in generating the cookie derivative.

4. The method of claim 3 wherein the non-cookie data is inserted into a query search string by a web page.

5. The method of claim 1 wherein the cookie data is encoded in the cookie derivative.

6. The method of claim 1 wherein the cookie data is obfuscated in the cookie derivative.

7. The method of claim 1 wherein the cookie data is redacted in the cookie derivative.

8. The method of claim 1 wherein the virtual cookie derivative comprises a non-persistent virtual cookie derivative.

9. The method of claim 1 wherein the virtual cookie derivative comprises a persistent cookie derivative.

10. The method of claim 9 further comprising storing the virtual cookie derivative in a server cache.

11. The method of claim 9 further comprising storing the virtual cookie derivative in a log file.

12. The method of claim 9 wherein the virtual cookie derivative comprises a temporary virtual cookie derivative.

13. The method of claim 1 wherein the virtual cookie derivative comprises data aggregated from at least two cookies.

14. The method of claim 13 wherein the at least two cookies are segregated within the first party domain.

15. The method of claim 14 wherein the at least two cookies are originated from different parties within the first party domain.

16. A non-transitory computer readable medium storing instructions for execution on a processor to perform a method comprising:
- receiving a request for content at a first party server, the request for content including at least one cookie associated with a first party domain of an advertiser;
- transforming a value component of a name/value pair of cookie data associated with the at least one cookie in response to the request for content to generate a temporary virtual cookie derivative at the first party server, the temporary virtual cookie derivative residing on the first party server for a limited period of time and comprising a derivative data value derived from the data associated with the at least one cookie wherein the operation of transforming cookie data comprises removing privacy related information of the cookie data, wherein the temporary virtual cookie derivative is discarded or written over after a limited number of transactions;
- passing the virtual cookie derivative to a third party ad server outside of the first party domain of the advertiser;
- evaluating, at the third party ad server, the derivative data value of the cookie derivative against targeting data to determine advertisement content to be returned in response to the request for content; and
- returning the determined advertisement content from the third party ad server in response to the request for content,
- wherein the at least one cookie is not modified at a client browser.

17. A method for providing a virtual cookie derivative comprising:
- receiving a request for content at a first party server, the request for content including at least one cookie associated with a content provider domain;
- transforming a value component of a name/value pair of cookie data associated with the at least one cookie in response to the request for content to generate a temporary virtual cookie derivative at the first party server, the temporary virtual cookie derivative residing on the first party server for a limited period of time and comprising a derivative data value derived from the data associated with the at least one cookie, wherein the operation of transforming cookie data comprises removing privacy related information of the cookie data, wherein the temporary virtual cookie derivative is discarded or written over after a limited number of transactions;
- passing the virtual cookie derivative to a third party server outside of the content provider domain;
- evaluating, at the third party server, the derivative data value of the cookie derivative against targeting data to determine advertisement content to be returned in response to the request for content; and
- returning the determined advertisement content from the third party server in response to the request for content,
- wherein the at least one cookie is not modified at a client browser.

18. The method of claim 17 wherein the operation of transforming cookie data comprises integrating data associated with the virtual cookie derivative with a least one other media type.

19. The method of claim 18 wherein the at least one other media type includes at least one of a publisher, an ad network, creative customization solutions, third-party ad servers.

20. The method of claim 17 wherein the operation of transforming cookie data associated with the at least one cookie to generate a virtual cookie derivative is performed in real time.

21. The method of claim 17 wherein the virtual cookie derivative is configured to be recognized outside of a domain associated with the at least one cookie.

22. The method of claim 1 wherein the operation of transforming cookie data comprises transforming privacy related information of the cookie data.

23. The method of claim 22 wherein the operation of transforming privacy related information of the cookie data comprises at least one of the group: redacting, obfuscating, and encoding the privacy related information of the cookie data.

24. The method of claim 1 wherein the operation of passing the virtual cookie derivative comprises embedding the virtual cookie derivative into a URL query string.

25. The method of claim 1 wherein the temporary virtual cookie derivative is discarded after the operation of evaluating, at the third party ad server, the derivative data value of the cookie derivative.

26. The method of claim 1 wherein the temporary virtual cookie derivative is discarded after a single or limited number of transactions.

27. The method of claim 26 wherein the temporary virtual cookie derivative is written over after the single or limited number of transactions.

28. The method of claim 1 wherein the temporary virtual cookie derivative is stored only in cache such that it will be overwritten on a subsequent transaction.

* * * * *